Dec. 15, 1931.  P. M. SALERNI  1,836,773
POWER TRANSMISSION MECHANISM
Filed July 24, 1928  9 Sheets-Sheet 1
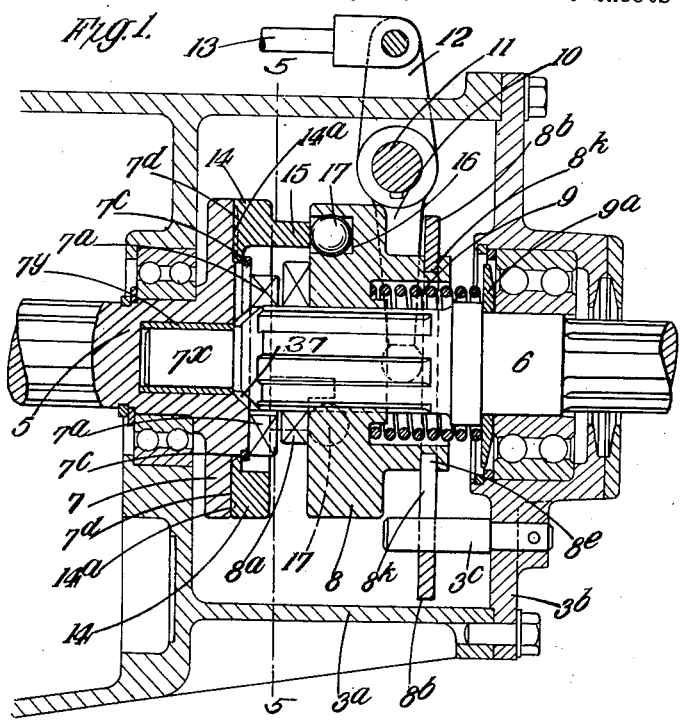
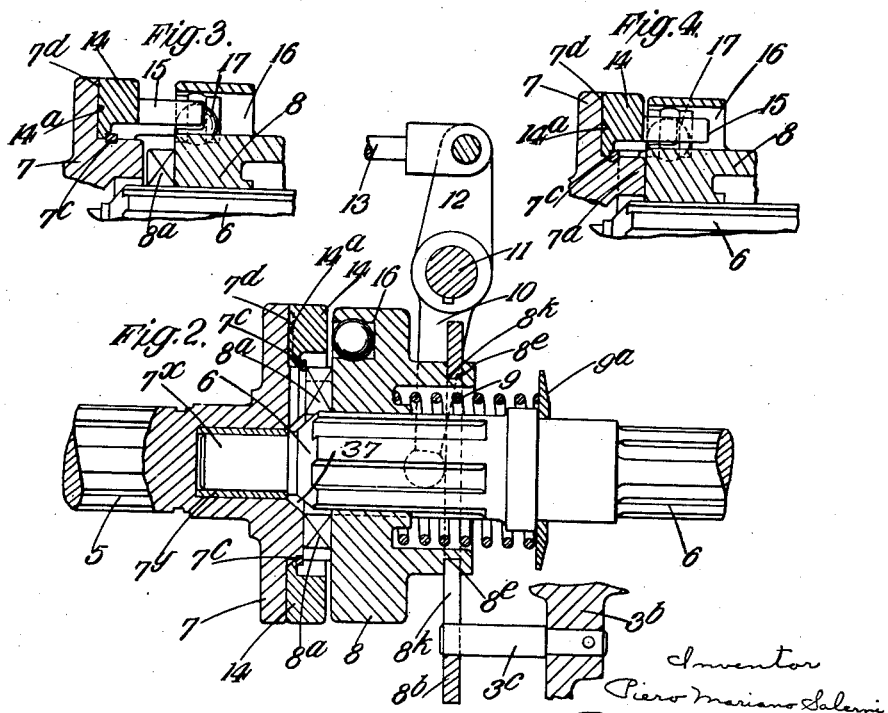

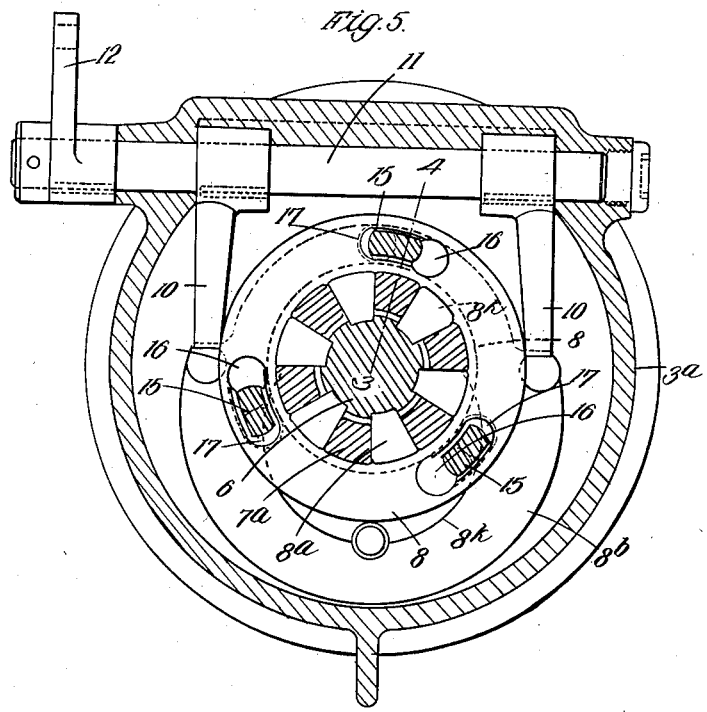

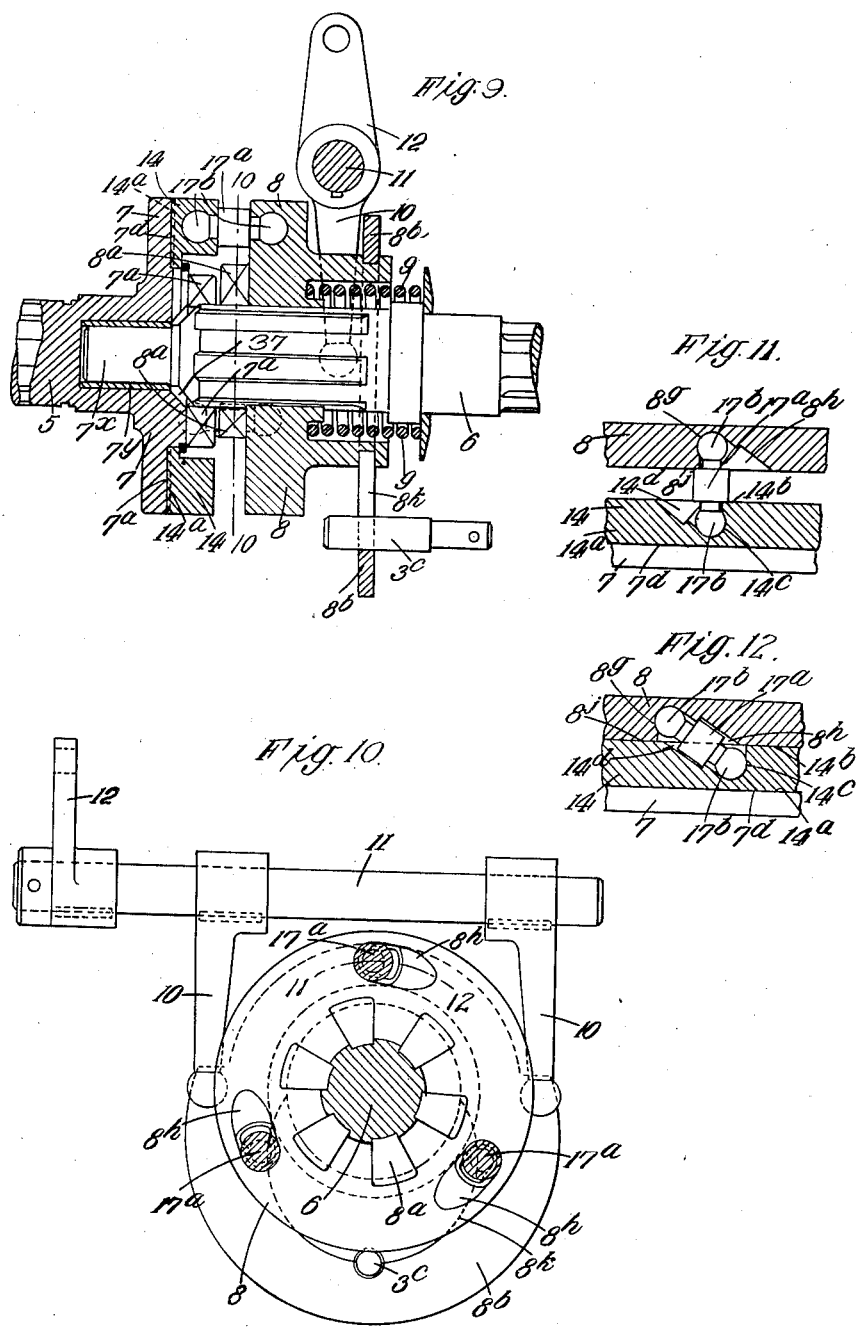

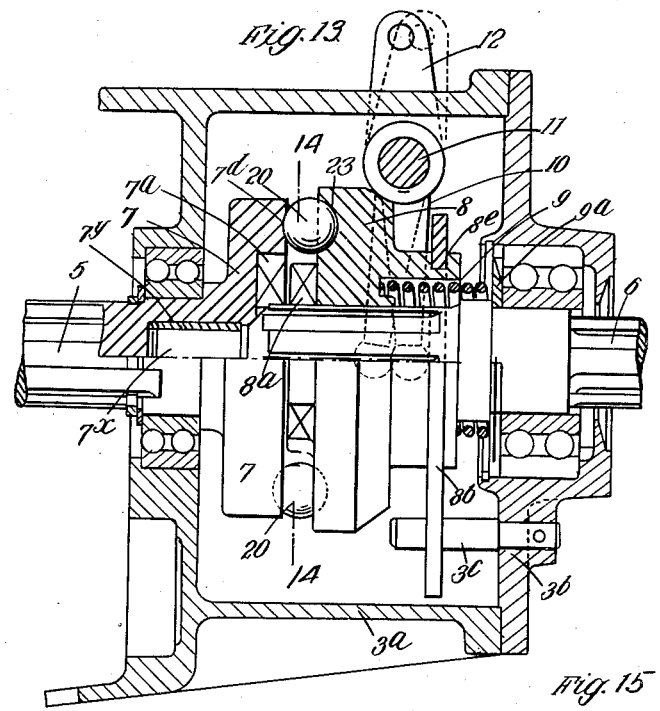

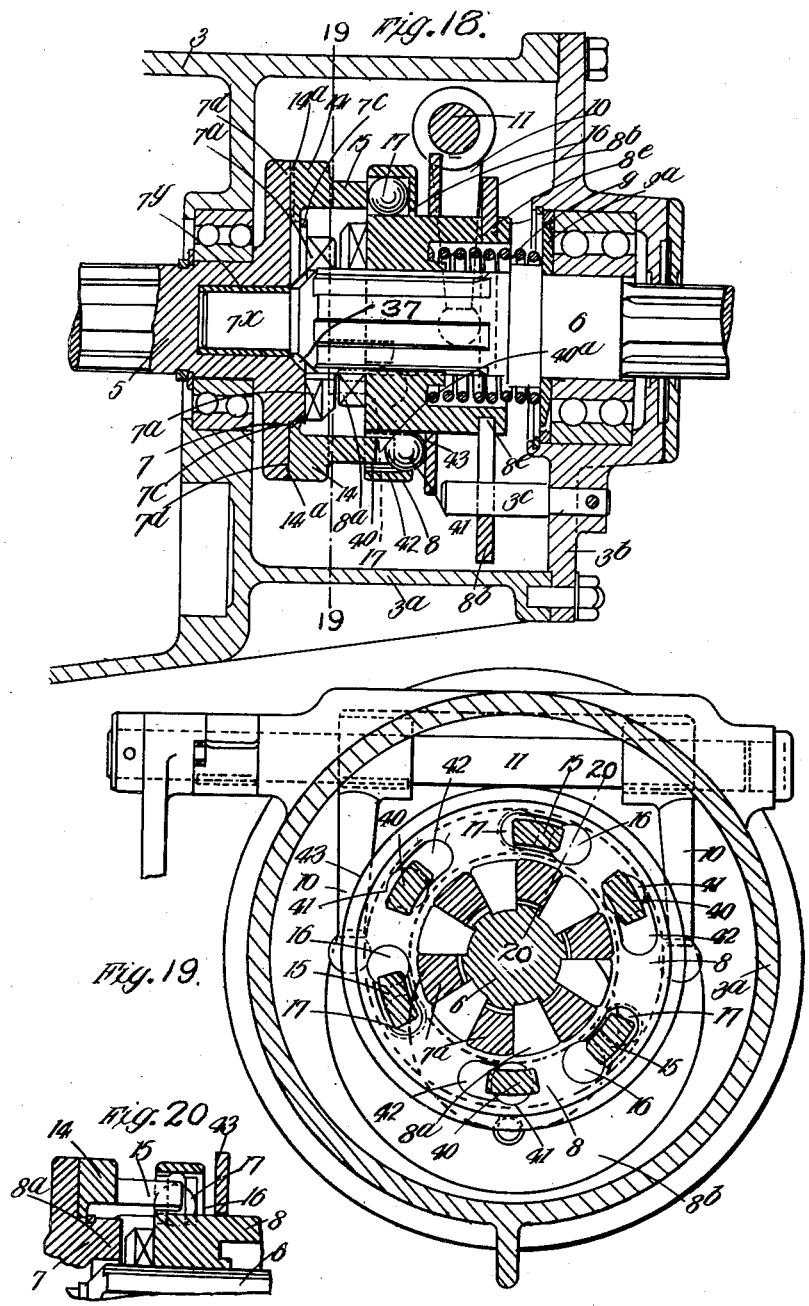

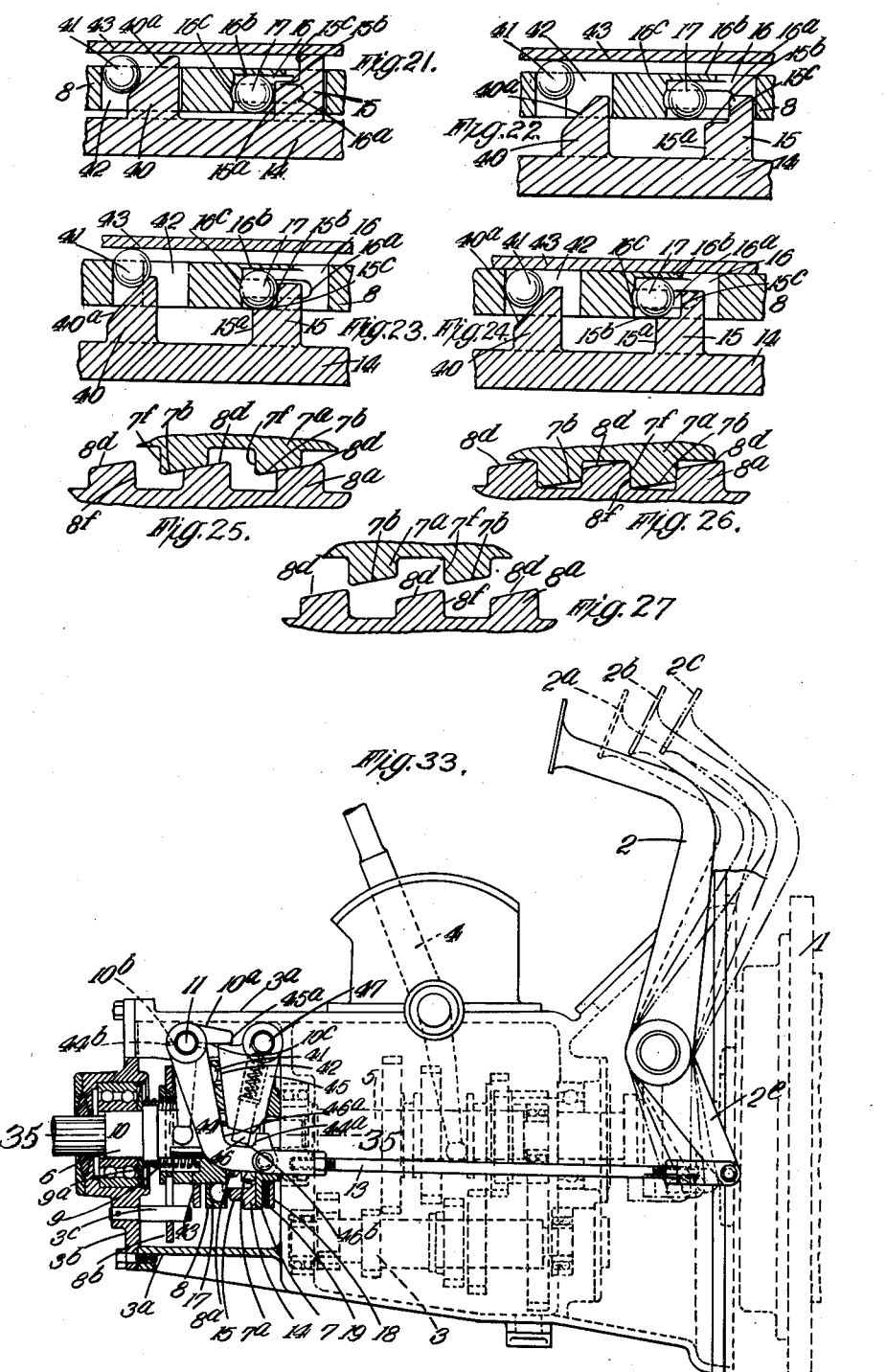

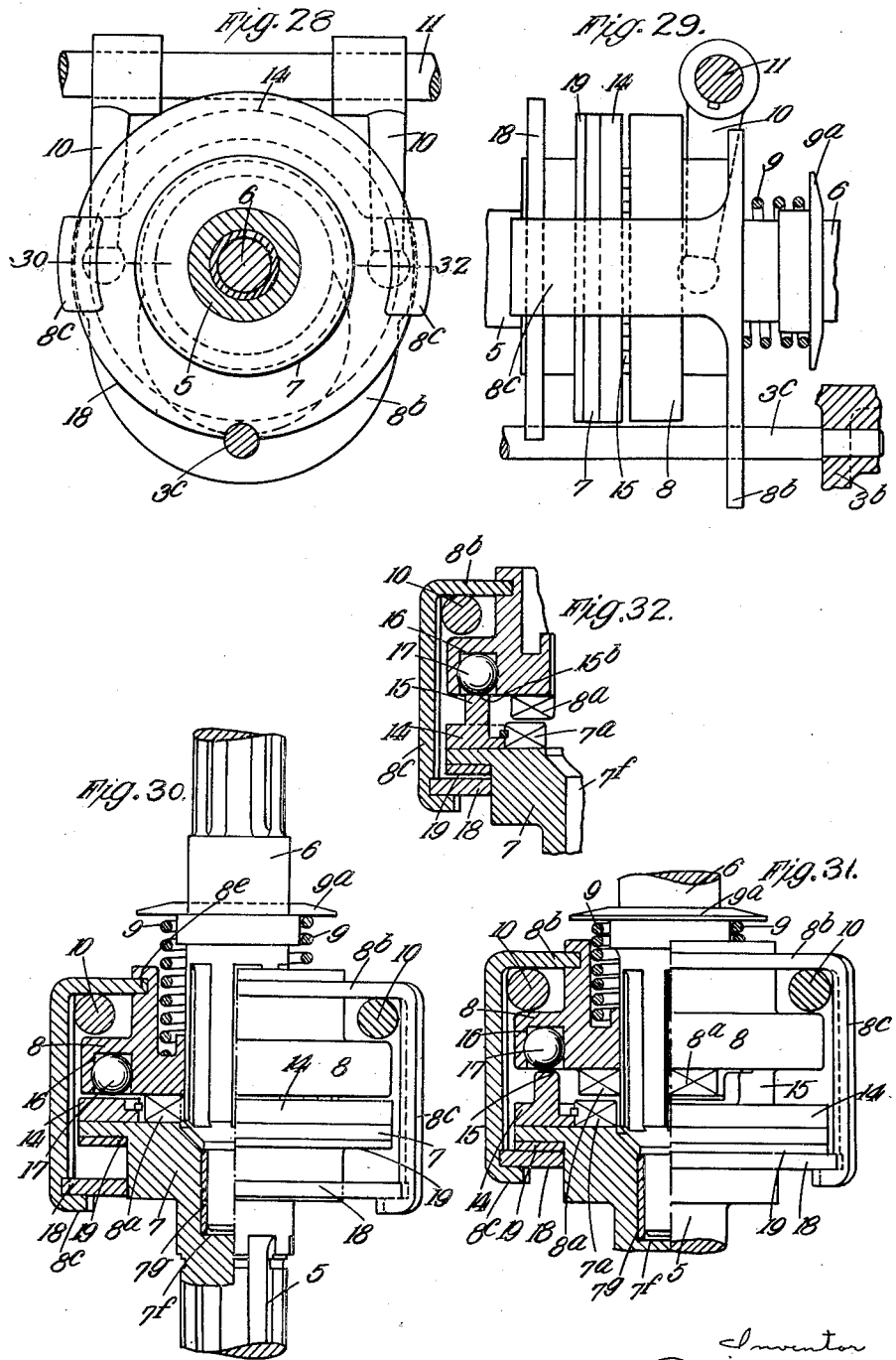

Dec. 15, 1931.  P. M. SALERNI  1,836,773
POWER TRANSMISSION MECHANISM
Filed July 24, 1928  9 Sheets-Sheet 8
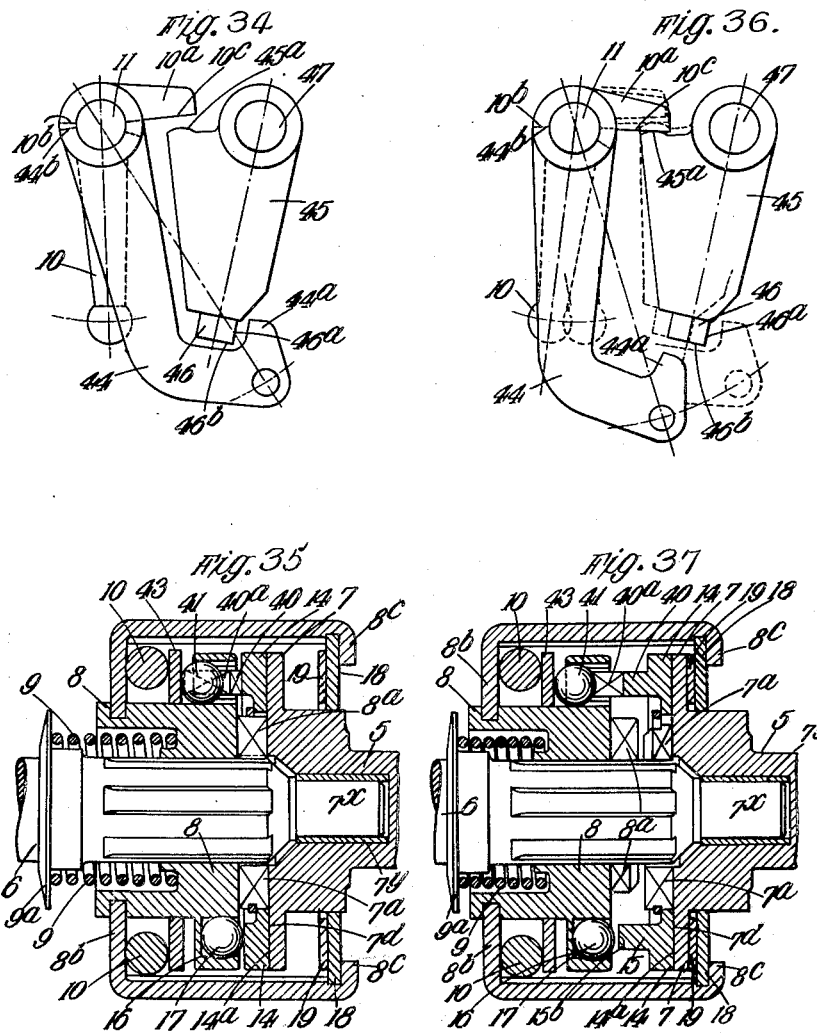

Dec. 15, 1931.  P. M. SALERNI  1,836,773
POWER TRANSMISSION MECHANISM
Filed July 24, 1928  9 Sheets-Sheet 9
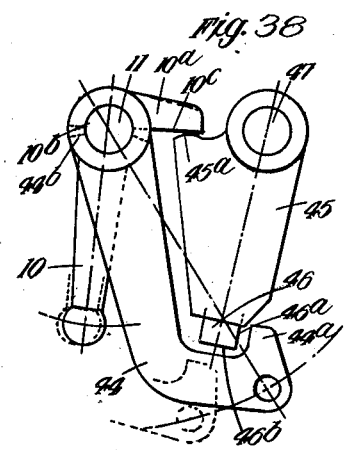
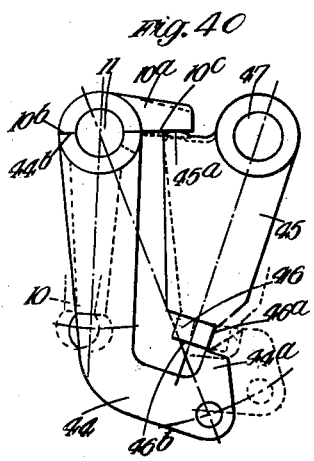
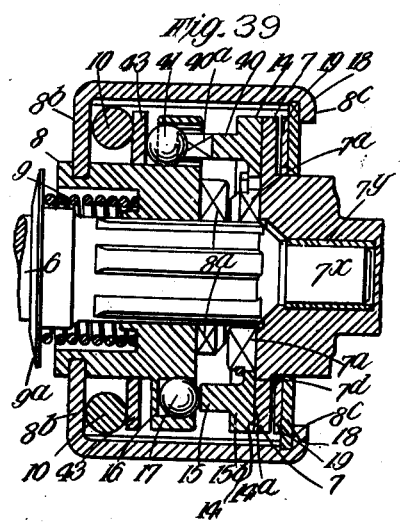
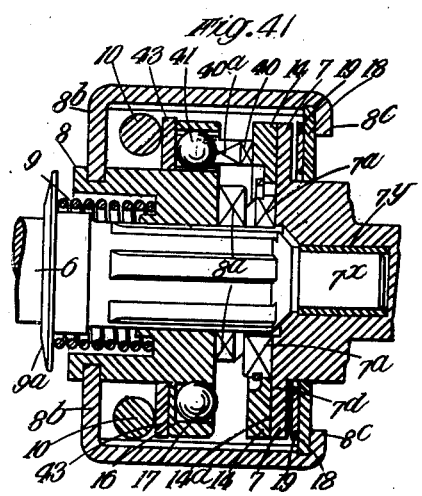

Patented Dec. 15, 1931

1,836,773

UNITED STATES PATENT OFFICE

PIERO MARIANO SALERNI, OF WESTMINSTER, ENGLAND

POWER TRANSMISSION MECHANISM

Application filed July 24, 1928, Serial No. 294,961, and in Great Britain December 6, 1927.

This invention relates to power transmission mechanism of mechanically propelled vehicles.

It is known to provide in the transmission mechanism of a mechanically propelled vehicle at a position between the change speed mechanism and the driving road wheels, a free wheel clutch that comprises wedging, jambing or ratchet driving means, for the purpose of enabling the vehicle to over-run the engine and for cooperating with the engine clutch so as to isolate the change speed mechanism with the object of facilitating gear changing. Such free wheel clutches have been adapted to provide a bi-directional drive while automatic means have been proposed to prevent the free wheel or one-way clutch from being rendered bi-directional until the driving shaft rotates at the same speed as the driven shaft. It has also been proposed to provide a friction clutch between the change speed mechanism and the driving road wheels so that it can transmit power from the former to the latter, which friction clutch can cooperate with the engine clutch for the purpose of isolating the change speed mechanism.

In connection with free wheel or one-way clutches as above referred to and also in connection with friction clutches disposed as aforesaid, it has been proposed to provide means such as jaw clutches for locking the free wheel clutch or the friction clutch and to prevent such locking means from coming into operation until the driving shaft rotates at the same speed as the driven shaft. The use of free wheel devices or one-way clutches such as aforesaid is undesirable in the transmission system of a mechanically propelled vehicle because such devices or clutches involve undue wear of the parts even when they are provided with means whereby they can be positively locked after the commencement of the drive. The transmission of power through wedging, jambing or ratchet means such as are comprised in the free wheel devices or one-way clutches, is particularly undesirable for reasons that are well known and this is especially so when the two shafts are clutched together at the commencement of the drive through the interposition of the wedging, jambing or ratchet means.

The provision of a friction clutch between the change speed mechanism and the driving road wheels is also undesirable because owing to the increased torque that has to be transmitted at this position, a friction clutch is liable to slip during driving, while if in order to avoid slipping positive locking means are provided to come into operation when the driving member tends to over-run the driven member, the friction clutch cannot be used satisfactorily for the purpose of enabling the vehicle to over-run the engine or to coast, when the positive locking means are unlocked, because quite apart from other difficulties, owing to the fact that it must maintain the driving member in contact with the driven member under the influence of the spring acting on the same after the engine clutch has been engaged for the purpose of bringing the locking means into operation when the driving member resumes or is about to resume drive, the two members cannot be completely or freely disengaged as is necessary for allowing the vehicle to over-run the engine, but must remain in partial engagement and must be made to slip, which involves friction likely to develop heat and undue wear of the parts.

The object of the present invention is to avoid the use of free wheel or one-way clutches and friction clutches as hereinbefore referred to, and to provide a coupling wherein the sound mechanical practice of transmitting power always, (that is, at the commencement of driving as well as during driving) through material under shear or bend loads is adhered to, and which, while providing the desirable characteristics of the ordinary free wheel or one-way clutch, entails none of the disadvantages usually associated with such clutches.

According to this invention I provide in the transmission system of a mechanically propelled vehicle a positive bi-directional coupling through which power can be transmitted to drive the vehicle and which is adaptd to be transformed at will into a coasting device to enable the vehicle to coast when required, the said coupling being adapted to revert automatically to its condition of a positive bi-directional coupling when the rotational speed of the driving member of the coupling synchronizes with that of the driven member.

The positive bi-directional coupling according to this invention is preferably but not necessarily located between the change speed mechanism and the driving road wheels and, in addition to being used for the purpose of enabling the vehicle to coast, may be used in conjunction with the engine clutch for the purpose of isolating the change speed mechanism so as to facilitate gear changing. The said coupling may be transformed at will into the coasting device by operating the engine clutch pedal or lever, or any other suitable operating device, and spring or other pressure is utilized to restore the device to its condition of a positive bi-directional coupling so that this action is entirely automatic after the clutch pedal has been actuated to provide the interruption in the transmission system and has been released to reengage the clutch. The said positive bi-directional coupling comprises a medium or media which is interposed between the coupling members in such manner that when they are uncoupled and the driven member is rotating faster than the driving member, it holds them apart against spring or other pressure while being rotated by the driven member freely relatively to the driving member for coasting as hereinbefore referred to, but which when the speed of the driving member synchronizes with that of the driven member, is moved relatively to the latter so as to enable the coupling members to be automatically recoupled, no power being transmitted until such recoupling has been effected. The said medium (by which term I also mean media), is so mounted or disposed between the coupling members that the connection or contact between it and the driven member of the coupling is such as to eliminate or reduce friction at this position as much as possible so as to enable rapid or instantaneous displacement or movement of the medium relatively to the driven member to be effected at the required time as aforesaid, and for this purpose a rolling contact or rocking connection may be used as hereinafter described. The connection or contact between the driving member and the medium can therefore be such that the driving member can easily and readily displace or move the medium relatively to the driven member when the speed of the driving member synchronizes with that of the driven member. The said connection or contact between the driving member and the medium is such as to permit of the medium being rotated by the driven member freely, that is without detrimental friction, relatively to the driving member for coasting purposes, and it is also such that it does not enable the driving member to transmit power to the driven member through the said medium. This contact or connection between the driving member and the medium may therefore be regarded as an anti-frictional one, and the said medium is therefore anti-frictionally interposed between the two coupling members in such manner as to permit of the medium being moved by the driven member freely relatively to the driving member for coasting purposes and also to permit of the said medium being rapidly or instantaneously displaced by the driving member relatively to the driven member when the speed of the former synchronizes with that of the latter.

The invention, however, is not limited to any particular kind of connection or contact at the driving side or at the driven side of the said medium as any suitable means may be provided so long as the medium can be rotated relatively to the driving member for coasting purposes freely, i. e. without detrimental friction, and can be displaced or moved relatively to the driven member for automatic recoupling of the coupling members as aforesaid.

The construction may be such that when the speed of the driving member synchronizes with that of the driven member, a differential frictional effect or action is set up which enables the medium to be displaced relatively to the driven member due to greater friction on the driving side of the said medium than exists at the driven side.

The construction may also be such that a rolling or similar contact may be provided which permits of the medium being rolled or angularly moved by the driving member relatively to the driven member so as to assume a position that permits of recoupling of the two members being effected. The medium may be mounted between opposing faces of the coupling members, which are provided with the driving dogs or the like so as to hold the latter out of engagement for coasting purposes, and the medium may be adapted to enter recesses or the like as a result of being moved by the driving member relatively to the driven member when the speed of the former synchronizes with that of the latter.

In one embodiment of the invention, the medium is in the form of a ring that can be rotated freely relatively to the driving member by the driven member while holding the members apart for coasting purposes and can be displaced or moved by the driving member relatively to the driven member, when the speed of the former synchronizes with that of the latter. The connection or contact between the driving member and the ring may be provided by flat faces thereon held together or in contact by spring or other pressure and an antifrictional connection or contact on the driven side of the said ring may be associated with distance pieces or projections that enable the coupling members to be held apart and to permit of rapid and instantaneous movement of the ring relatively to the driven member when rotated by the driving member.

In another embodiment, balls or rollers may be used to serve as distance pieces for holding the coupling members apart while being moved by the driven member freely relatively to the driving member for coasting purposes, the said balls providing, however, a rolling contact between the two members when the speed of the driving member synchronizes with that of the driven member so that the balls can be rolled relatively to the driven member into recesses or the like for enabling the two members to be recoupled.

In another example, balls or rollers similar to those just referred to may after being rolled or displaced by the driving member as aforesaid serve as driving dogs or keys for enabling power to be transmitted from one coupling member to the other through material under shear load, the arrangement being such that no power is transmitted during such displacement of the balls, rollers, or the like, so that the drive takes place only after the two members have been recoupled.

In using the word "power" throughout the specification and claims, I mean substantial or appreciable power and not such negligible power as would inevitably be transmitted by the slight friction of an anti-friction bearing or contact.

An important feature of the present invention is the provision of means whereby the positive bi-directional coupling, while operating as a coasting device, can be actuated at will to permit of the coupling members being recoupled irrespective of the relative rotational speeds of the driving and driven members, so as to enable the condition of a positive bi-directional coupling to be reverted to in an emergency, such as in case the engine should stop and the self-starter fail to operate during coasting. For this purpose the said means may be operated to move the aforesaid medium while it is holding the coupling members apart, so that it is caused to assume a position in which it permits of the said members being recoupled.

When the coupling members are provided with interengaging dogs or the like. the latter may be provided with inclined or bevelled faces to facilitate recoupling, and the said faces may be such that if it be desired to recouple the two members while one is rotating faster than the other. the member rotating at the slower speed will be engaged by the other member and speeded up (as by a "flip" clutch) so that recoupling can take place when the two members are rotating at the same speed or substantially so. The means for effecting such recoupling at will may be actuated by the movement of the ordinary clutch pedal or lever or a separate operating device may be provided.

In order that my invention may be clearly understood and readily carried into effect, the same will now be described more fully with reference to the accompanying drawings in which:

Fig. 1 is a vertical sectional view showing one constructional form of my invention, with the coupling members out of engagement, Fig. 2 is a view similar to Fig. 1 showing the coupling members in engagement, Figs. 3 and 4 are fragmentary vertical sectional views taken on the line 3—4 of Fig. 5 showing the coupling members disengaged and engaged respectively, Fig. 5 is a transverse sectional view on the line 5—5 of Fig. 1, Fig. 6 is a plan view of the coupling members partly in section, Figs. 7, 8 and 8a are fragmentary sectional plan views showing the parts in different positions, Fig. 9 is a view similar to Fig. 1 showing another construction, Fig. 10 is a transverse sectional view on the line 10—10 of Fig. 9, Figs. 11 and 12 are fragmentary sectional plan views on the line 11—12 of Fig. 10 showing the parts in two different positions corresponding, respectively, to the disengaged and the engaged positions of the coupling members.

Fig. 13 is a side view with the upper portion in section of another constructional form of my invention, the parts being shown in the disengaged position, Fig. 14 is a transverse sectional view on the line 14—14 of Fig. 13, Fig. 15 is a fragmentary side view of Fig. 13 showing the parts in the engaged or driving position, Figs. 16 and 17 are diagrammatic sectional views taken approximately on the line 16—17 of Fig. 14, showing the parts in the disengaged and in the engaged positions respectively, Fig. 18 is a vertical sectional view showing another constructional form of my invention with the coupling members in the disengaged position, Fig. 19 is a transverse sectional view on the line 19—19 of Fig. 24, Fig. 20 is a local section on the line 20—20 of Fig. 19.

Figs. 21, 22, 23 and 24 are developed sectional views showing certain of the parts of Figures 18 and 19 in different positions hereinafter described, Figs. 25, 26 and 27 are also developed sectional views showing other parts of Figs. 18 and 19 in different positions hereinafter described, Figs. 28 to 32 illustrate a construction similar to Figs. 1 to 8 but with the addition of a braking device for particular use with a change speed gear, Figs. 28 and 29 being a transverse or end view and a side view, respectively, while Figs. 30, 31 and 32 are sectional plan views taken on the line 30—32 of Fig. 28, showing the parts in different positions, Fig. 33 is a sectional side view showing another constructional form of my invention with the parts in the "coasting" position, this view also showing means for effecting the whole of the control of the device from the clutch pedal of the vehicle, Fig. 34 is a diagram showing certain parts of Fig. 33 in a position hereinafter described, Fig. 35 is a sectional plan on the line 35—35 of Fig. 33 and drawn to a larger scale, the position of the parts corresponding to the position occupied by the parts in Fig. 30, and Figs. 36 to 41 are pairs of views similar to Figs. 34 and 35 showing the parts in different positions hereinafter described.

In the embodiment of my invention illustrated in Figs. 1 to 8a, the driving member 7 of the coupling is carried by the driving shaft 5, i. e. the shaft on the engine side of the coupling, and a slidable driven member 8 is splined on and carried by the driven shaft 6, i. e. the propeller shaft or a shaft driving it. The forward end of the shaft 6 is provided with an extension 7x disposed in a journal bearing constituted by a bush 7y of bronze or other suitable metal or alloy in the rear end of the driving shaft 5. The driving member 7 and the driven member 8 are provided with dogs or teeth 7a and 8a respectively, which are maintained in engagement to provide the positive drive between the driving shaft 5 and the driven shaft 6 by a spring 9 interposed between the driven member 8 and an abutment 9a thus forming a positive bi-directional coupling as hereinbefore defined. The driven member 8 is adapted to be moved axially on the shaft 6 against the action of the spring 9 by levers 10 which are disposed in a groove formed between a part of the driven member 8 and a ring 8b carried by this member.

The said ring 8b has an elongated opening 8k which is larger at one part and smaller at another part to enable it to be fitted into a groove 8e in the sliding member 8 in such manner that it will follow any axial movement of the member 8 but will allow easy relative rotation between it and the latter to take place, the said ring being held in position and against rotation by a pin 3c on an end plate 3b. The said levers 10 are mounted on a shaft 11 having an arm 12 which is connected with a link 13 which in turn is connected with operating means such as a lever. Movement of the arm 12 causes the said levers 10 to be angularly moved for sliding the driven member 8 axially out of engagement with the driving member 7 against the action of the spring 9. In this example, the medium which is disposed between the driving member 7 and the driven member 8 is in the form of a ring 14 rotatably retained on the driving member 7 against axial movement relatively thereto by means of a comparatively light spring 7c. The opposing faces of the driving member 7 and the ring 14 are in contact in this example, and as shown, they are normal to the axis of rotation to provide an antifrictional contact that permits of the ring being freely rotated relatively to the driving member as hereinbefore described. Oil may be introduced between the opposing faces of the driving member and the ring through a passage 37 as shown in Figs. 1, 2, 9 and 24. The slight friction which exists between the driving member and the said ring is in excess of such friction as there may be between the said ring and the driven member 8, so that the differential frictional effect or action is brought about as hereinbefore referred to when the coupling is to be transformed into a coasting device.

The ring 14 has a series of stepped projections 15 on its outer or rear face which are adapted to project into recesses or openings 16 in the slidable driven member 8 and which cooperate with a series of anti-friction balls 17 movably mounted in the said recesses or openings, a cross section of which is shown in Fig. 6. Each ball is inserted in an opening 16 and then moved laterally into an undercut part or groove 16a so as to be located against a surface 16b. The projections 15 when fitted in the said recesses 16, prevent the balls from being moved out of the recesses, but permit of them being displaced therein relatively to the surfaces 16b.

Assuming that the members 7 and 8 are coupled together to provide the positive bi-directional drive by the interengagement of the dogs or teeth 7a and 8a, the two members will rotate together and carry with them the ring 14 in the position indicated in Fig. 7, the balls 17 being disposed between the surfaces 16c on the driven member 8 and the faces 15a of the projections 15 so as to cause the ring 14 to be rotated with the two members.

When it is desired to uncouple the driving and driven members and the two shafts 5 and 6, the link 13 is made to move angularly the arm 12 and the shaft 11 so that the levers 10 move the driven member 8 axially against the action of the spring 9. The driven member 8 is thereby moved away from the driving member 7, so that the dogs 7a and 8a become completely disengaged, and from the ring 14 to the position shown in Fig. 8, the faces 15b being withdrawn sufficiently to clear the balls 17.

Assume now that, while the action of the levers 10 continues to maintain the driven member 8 in the said withdrawn position, the source of power is cut off; then the rotational speed of the driving shaft 5 will tend to decrease and if the driven shaft has greater momentum than the driving shaft (as would be the case if the former were connected with the propeller shaft of a vehicle in motion) it will continue to rotate at a speed higher than that of the driving shaft, the ring 14 and the projections 15 being thereby immediately moved relatively to the balls 17 into the position shown in Figure 8a. The arm 12 is now operated to release the driven member 8 so that the action of the spring 9 will move the driven member 8 axially towards the driving member 7, such axial movement becoming arrested as soon as the faces 15b come into contact with the balls 17 as shown in Fig. 6, the pressure of the spring 9 being now transmitted through the balls 17 and the ring 14 to the face 7d of the driving member 7.

By reason of the balls 17 being disposed between the faces 16b on the driven member 8 and the faces 15b of the projections 15, they serve as distance pieces or stops that maintain the driving member 7 and the driven member 8 at such a distance from one another that the dogs 7a and 8a completely clear one another. The positive coupling is therefore transformed into a coasting device as hereinbefore referred to and it will remain in this condition so long as the speed of the driven shaft exceeds that of the driving shaft, during which time the ring 14 is rotated by the driven member freely relatively to the driving member owing to the anti-frictional character of the contact between them. Upon the rotational speed of the driving shaft 5 and the driving member 7 being increased to synchronize with that of the driven shaft 6 and the driven member 8, the driving member will, owing to its contact with the ring 14, immediately move the latter rotationally relatively to the driven member 8, and owing to the balls 17 providing an anti-frictional rolling contact with less friction than there is between the driving member and the said ring, the projections 15 on the latter will roll past the balls 17 with the result that as the balls no longer act as distance pieces or stops between the driving and driven members 7 and 8, the spring 9 will slidably move the latter towards the former. The dogs 7a and 8a on the coupling members tend to become interengaged and as at this moment the rotational speeds of the driving and driven members 7 and 8 are substantially equal, interengagement of the dogs will be effected smoothly and quietly. Thus the coupling is automatically restored to its condition of a positive bi-directional coupling as soon as the driving member rotates at a speed that synchronizes with that of the driven member.

The example shown in Figs. 9 to 12 is similar to that illustrated in Figs. 1 to 8a but, instead of using the projections 15 and anti-friction balls 17, collapsible or rocking levers 17a are interposed between the ring 14 and the driven member 8 to act as distance pieces between the driving member 7 and the driven member 8 when (while the coupling is uncoupled) the rotational speed of the driven member 8 exceeds that of the driving member 7, i. e. when the coupling is in the coasting condition. The levers 17a are constituted by cylinders each end of which carries a ball-shaped projection 17b, and they are located in seatings 14c and 8g in the ring 14 and in the driven member 8 respectively. The seatings 14c and 8g are respectively adjoined by recesses 14d and 8h into which the levers 17a collapse by rocking movement when the rotational speed of the driving member synchronizes with that of the driven member. In this case the levers 17a provide a rocking anti-frictional connection between the ring 14 and the driven member, but the degree of friction is less than that provided between the contacting or opposing faces of the driving member and the ring 14, so that when the speed of the driving member synchronizes with that of the driven member, the said ring 14 is advanced rotationally by the former relatively to the latter, thus causing the levers 17a to move angularly and collapse into the position shown in Fig. 12, thus enabling the driven member 8 to be moved axially towards the driving member by the spring 9 for the purpose of re-coupling the members 7 and 8 and providing the positive bi-directional coupling. After uncoupling the members 7 and 8 as hereinbefore described and, so long as the rotational speed of the driven member exceeds that of the driving member, the levers 17a will, owing to their shape, be held firmly in the position shown in Fig. 11, the edges of their cylindrical portions being locked against the face 14b of the ring 14 and the face 8j of the driven member 8; in which position they act as distance pieces to maintain the driven member 8 away from the driving member 7, so that the dogs 8a and 7a are clear of one another, and render rotation of the ring 14 relatively to the driven member 8 impossible while the latter rotates at a speed exceeding that of the driving member 7. The ring 14 is therefore rotated by the driven member freely relatively to the driving member, owing to the anti-frictional character of the contact between the said ring and the driving member, thus enabling the vehicle to coast as aforesaid. So soon however as the speed of the driving member 7 synchronizes with that of the driven member 8, the levers 17a will collapse, thus allowing the driven member 8 to move axially under the influence of the spring 9 towards the driving member 7 and the dogs 7a and 8a to become positively interengaged to provide the positive bi-directional coupling.

The example illustrated in Figs. 13 to 15 is generally similar to that described in Figs. 1 to 8a and similar reference numerals are used for corresponding parts, but the ring 14 having the projections 15 as hereinbefore described is dispensed with and balls 20 interposed between the driving and driven members 7 and 8 are adapted to serve as distance pieces that maintain the said members out of engagement when required. These balls 20 are disposed in grooves or recesses 21 formed in the face of the driven member 8 and they are in contact with the opposing face 7d of the driving member 7 in any position in the recesses. The recesses 21 are of arcuate formation as shown in Fig. 14, and each of them is formed with an inclined bottom 22 to provide a shallow end and a deep end as shown in the diagrammatic sectional views in Figs. 16 and 17. When the balls are disposed in the deep ends of the grooves or recesses, as shown in Fig. 17, the two members 7 and 8 are coupled together with their dogs or teeth 7a and 8a in interengagement to provide the positive bi-directional coupling as aforesaid.

When it is desired to uncouple the two shafts 5 and 6, the levers 10 are operated by means of the shaft 11 to withdraw the member 8 against the action of the spring 9, and as the member 8 moves away each ball tends to lag behind the rotating member 8, owing to loss of momentum due to air and oil resistance, and is, therefore, caused to roll up the inclined bottom 22 of the recess until it reaches a flat or substantially flat part 23 at the shallow end of the recess. If the source of power be now cut off, the driving shaft 5 will slow down and, assuming the driven shaft 6 to continue, owing to greater momentum, to rotate at a speed in excess of that of the driving shaft 5, then each ball 20 will be held by the over-running driven member 8 between the flat surface 23 at the shallow end of the groove or recess 21 and the opposing face 7d of the driving member, and rotated with the driven member freely relatively to the driving member, thus preventing the two members from becoming engaged and positively coupled together and enabling the coupling to function as a coasting device. Upon the speed of the driving member synchronizing with that of the driven member, the balls are rolled by the driving member and therefore each ball is rolled off the flat surface 23 at the shallow end of the recess 21 and down the incline 22 to the deep end of the recess, while the spring 9 presses the driven member 8 towards the driving member 7 so that the teeth 7a and 8a become interengaged to provide the positive bi-directional coupling.

Figs. 18 to 27 illustrate an example similar to that illustrated in Figs. 1 to 8a but in this example the dogs or teeth 7a and 8a are provided with inclined faces in the direction of driving engagement, as shown at 7b and 8d in Figs. 25 to 27, for the purpose of facilitating normal interengagement of the dogs when the speed of the driving member synchronizes with that of the driven member. When the driven member 8 is withdrawn and is prevented from reengaging the driving member 7 by the interposition of the balls 17 between the faces 15b of the projections 15 on the ring 14 and the faces 16b on the driven member 8 (as in Fig. 18), the dogs or teeth 7a and 8a on the driving and driven members, respectively, are in the position relatively to one another shown in Fig. 27. If the speed of the driving shaft 5 and the driving member 7 be now increased until it first equals and then just exceeds, that of the driven member 8, the ring 14 which is in contact with the driving member 7 will be carried by the latter at a speed slightly in excess of that of the driven member 8 thus allowing the member 8 to advance axially towards the driving member 7 under the influence of the spring 9 as hereinbefore described. This axial movement of the driven member 8 will continue until the inclined faces 8d on the dogs 8a come into contact with the similarly inclined faces 7b of the dogs 7a on the driving member 7, as shown in Fig. 25. The dogs 7a will now continue to travel down the slopes or inclines on the faces of the dogs 8a, (the rotational speed of the driving member 7 being slightly in excess of that of the driven member 8), until the faces 7f and 8f on the dogs of the driving and driven members, respectively, come into contact, when the dogs will be forced into complete and positive interengagement as shown in Fig. 26.

In this embodiment is illustrated one example of the means for recoupling the two members 7 and 8 at will, while the rotational speed of the driven member 8 exceeds that of the driving member 7. Referring to Figs. 18 and 19 and the diagrammatic cross sectional views Figs. 21 to 24, the driving member 7 and the recesses 16, which cooperate with the projections 15 on the ring 14, are substantially as hereinbefore described in the example illustrated in Figs. 1 to 8a, but in the present example the ring 14 is provided with three additional projections 40 each of which is disposed between two of the projections 15. The projections 40 are provided with sloped or inclined faces 40a and they are arranged to enter recesses 42 in the driven member 8. Balls 41 are located in the recesses 42 between the sloping faces 40a and a plate or washer 43, the latter being free to move axially relatively to the driven member 8 under the influence of the levers 10. Fig. 21 illustrates the relative positions of the ring 14, the driven member 8 and the plate 43, when the dogs 7a and 8a are in positive driving interengagement as in Fig. 26. In Figs. 23 and 27, the dogs 8a on the driven member are withdrawn from engagement with the dogs 7a on the driving member and are prevented from reengaging by the interposition of the balls 17 between the faces 16b on the driven member 8 and the faces 15b of the projections 15 on the ring 14, the driven shaft 6 at this time rotating at a higher speed than the driving shaft 5. If the operating levers 10 be now moved in the direction opposite to that required to withdraw the dogs from engagement, that is to say, towards the driving member 7, the ends of the levers 10 will move the plate 43 towards the driving member 7 and press the balls 41 against the sloping faces 40a on the projections 40 (see Fig. 24), thereby causing the ring 14 to slip rotationally relatively to the driven member 8 until the faces 15b of the projections 15 have cleared the balls 17, which will then allow the driven member 8 to be forced by the action of the spring 9 into engagement with the driving member 7 in spite of the fact that, at the moment, the rotational speed of the driven member substantially exceeds that of the driving member.

While the provision of the inclined faces 7b and 8d on the dogs 7a and 8a serves to facilitate automatic interengagement of the dogs for the purpose of resumption of drive by the driving member when the speed of the latter equals or just exceeds that of the driven member, it also serves to prevent the dogs from being damaged in the event of the driving member and the driven member being forced against one another as aforesaid at a time when the speed of the driven member substantially exceeds that of the driving member, as would otherwise be the case if, while the speed of the driven member exceeds that of the driving member, the plate 43 were moved to force balls 41 against the sloping faces 40a. The inclined faces 7b and 8d in this case act as a ratchet "flip" clutch tending to equalize the speeds of the two members until a point is reached when comparatively smooth interengagement of the dogs will be effected.

Figs. 28 to 32 illustrate an embodiment of the invention in which is incorporated a device for braking the rotational momentum of the driving shaft 5 when the source of power is cut off and the driving member 7 is disconnected from the driven member 8. Parts similar to those referred to in the example shown in Figs. 1 to 8a are designated by corresponding reference numerals. The plate 8b which is fitted in the groove 8e in the driven member 8 is provided with forwardly and oppositely disposed lugs 8c extending beyond and outside the two members. The outer or free ends of these lugs are inwardly turned and sprung over a brake ring 18 which is anchored against rotation by a notch fitting over the pin 3c and which fits in grooves in the said lugs so as to be movable with the driven member 8 when the latter is moved axially by the levers 10 or by the spring 9 relatively to the driving member 7. The latter is provided with a ring of friction material 19 (such as that sold under the registered trade mark "Ferodo") on its front face, so that the brake ring 18 can be moved into contact with the friction material ring 19 on the said driving member 7. Normally, that is, when the two members 8 and 7 are in positive driving engagement, the brake ring 18 is maintained in the position shown in Fig. 30. When the levers 10 are operated to withdraw the driven member 8 out of positive engagement, the plate or ring 8b, moving with the driven member 8, will draw the brake ring 18 against the friction material ring 19 on the driving member 7 as shown in Fig. 31, so as to retard or arrest the rotation of the driving shaft 5. When the operating levers 10 are released or moved to allow of reengagement of the driving and the driven members 7 and 8, the driven member 8 will be moved axially by the spring 9 so far as the ball 17 bearing against the face 15b of the projection 15 of the ring 14 (see Fig. 32), will permit, so that in this position the brake ring 18 will be held away from the friction material 19 on the driving member 7, which latter will therefore be free to rotate and increase in speed until it commences to over-run the driven member 8, thereby moving the ring 14 and the projections 15 rotationally relatively to the balls 17 until the faces 15b have rolled over and cleared the latter, whereupon the spring 9 will force the driven member 8 into positive engagement with the driving member 7, and, inasmuch as the brake ring 18 being positively connected with the plate 8b must follow any axial movement of the driven member 8, it will be brought into the position shown in Fig. 30 clear of the friction face of the ring 19.

Fig. 33 illustrates a form of the invention as fitted between the gear box and the propeller shaft of a motor car for the purpose of facilitating gear changing and providing for "coasting", this form embodying in combination the features of the constructions according to Figs. 18 to 27 and Figs. 28 to 32 (the same reference numerals indicating similar parts) as well as other features which will be described. In this figure, which shows the parts in the "coasting" position, 1 represents a common engine clutch of any type adapted to be operated in the usual manner by a foot lever or pedal 2. 3 indicates a change speed gear or gear box of conventional construction in which the slidable gear wheels are operated by the hand lever 4 in the usual manner. The main driving shaft 5 of the gear box is separate from a shaft 6 which is connected with the propeller shaft through a universal joint as usual. The pedal 2 is provided with an extension 2c with which is connected a rod or link 13, which link is pivotally attached to an arm 44. The said arm 44 is pivotally mounted on the shaft 11 to which are rigidly keyed the operating levers 10 and an arm or projection 10a for cooperating with part of a lever 45 forming a portion of a trip device as will be hereinafter explained. The said arm or projection 10a is provided with a dog or operating face 10b which cooperates with a similar face or dog 44b on the pivotally mounted arm or lever 44.

Figs. 34 and 35 show the relative positions of the various parts when the two members 7 and 8 are in positive driving engagement, and the engine clutch is in normal or driving engagement. By reason of the space shown between the two faces 10b and 44b in Fig. 34, the pedal 2 can be depressed from the position shown in full lines in Fig. 33 to the position 2a so as to disengage the engine clutch 1 without affecting the position of the shaft 11 to which the operating levers 10 and the projection 10a are positively keyed, the arm 44 being free to pivot on the shaft 11 until the faces 10b and 44b abut. Further motion of the pedal 2 to the extreme position 2c causes the said faces 10b and 44b to abut and the arm 44 to displace regularly the shaft 11 and the levers 10 for sliding the driven member 8 out of engagement with the driving member 7 against the action of the spring 9, thus bringing the parts into the relative positions shown in Figs. 36 and 37. Referring to Fig. 37, the driven member 8 is disengaged from the driving member 7 and the main shaft 5 and the rotation of the latter is arrested or retarded by the brake ring 18 pressing the friction material 19 against the back surface of the member 7. The gear box is now isolated and the rotation of its parts substantially arrested so that the lever 4 can easily be operated to effect a change of gear smoothly. During this operation a toe 44a on the arm 44 cooperates with the front surface 46a of the projecting end of a spring-controlled plunger 46 carried by the lever 45 and displaces the latter into the position shown by dotted lines in Fig. 36, immediately prior to the moment at which the faces 44b and 10b come into contact, the toe 44a then slipping past the end of the plunger 46; continued movement of the arm 44 then causes the projection 10a to return the lever 45 to the original position which is shown in full lines in Fig. 36. If the clutch pedal 2 be then released and allowed to return to the position shown in full lines (when the engine clutch 1 will be reengaged) the driven member 8 will be moved by its spring 9 so far as the balls 17 bearing against the faces 15b of the projections 15 on the ring 14 (see Fig. 39) will permit, so that in this position, which is the "coasting" position, the brake ring 18 which carries the friction material 19 is held away from the driving member 7, the latter being free to rotate with the engine clutch. During the return movement of the arm 44 from the position shown in Fig. 36 to that shown in Fig. 38 the toe 44a bears against the base 46b of the plunger 46 and moves the latter upwards against the resistance of its spring until the said toe slips past the end of the plunger, which is then returned by its spring into the position shown by full lines in Fig. 38, i. e. behind the toe 44a. If the engine be "ticking over", i. e. moving very slowly, and the speed of the vehicle be relatively high, the vehicle will continue to "coast" the speed of rotation of the driven member 8 being substantially greater than that of the driving member 7, until the speed of the engine and consequently that of the driving member 7 is increased to a point where it commences to over-run the driven member 8 on the shaft 6, which shaft 6 is coupled with the propeller shaft as aforesaid, so as to move the ring 14 rotationally relatively to the driven member until the faces 15b of the projections 15 have rolled over and cleared the balls 17, whereupon the spring 9 will cause the parts to assume the positive driving position shown in Fig. 35 as hereinbefore described.

If it should be required to recouple the two members 7 and 8 while the latter is revolving at a speed substantially greater than that of the driving member 7, as for instance in the emergency when the engine having accidentally stopped while the vehicle is "coasting" (the parts being in the position shown in Figs. 38 and 39), and it is desired to utilize the momentum of the car to restart the engine, the depression of the clutch pedal 2 into the intermediate position 2b (see Fig. 33), will bring about this result, as shown in Figs. 40 and 41. Inasmuch as if the pedal 2 be depressed when the vehicle is "coasting", i. e. with the parts in the position shown in Figs. 38 and 39, the arm 44 will be moved from the position shown in Fig. 38 to that shown in Fig. 40, in which figure the dotted lines indicate the relative positions of the parts as shown in Fig. 38, and the toe 44a on the arm 44 will meet the face 46a of the plunger 46 in the lever 45 to cause the latter to be moved from the position indicated by the doted lines in Fig. 40 to that shown in full lines. The face 45a of the lever 45 will then cooperate with the face 10c of the projection 10a, which is rigidly keyed to the shaft 11, and will cause the latter together with the operating levers 10 to be moved in a direction opposite to that required to disengage the member 8 from the driving member 7. The levers 10, if so moved, will force the plate 43, which cooperates with the balls 41, against the sloping faces 40a of the projections 40, thereby moving the ring 14 frictionally relatively to the driven member 8 until faces 15b of projections 15 have rolled over and cleared the balls 17, thus allowing the driven member 8 to be forced into positive driving engagement with the driving member 7 under the influence of the spring 9 as hereinbefore described with reference to Figs. 18 to 24. When this occurs, the movement of the member 8 causes the parts 10, 44 and 45 to be returned to their original positions as shown in Fig. 34. This emergency reengagement of the members 7 and 8 can be effected comparatively smoothly by first depressing the pedal 2 to the position 2a shown in Fig. 33, which disengages the engine clutch, thus leaving the change speed mechanism free to be speeded up by means of the ring 14, which is rotated by the driven member 8 and is pressed against the face 7d of the driving member 7 by the action of spring 9 which is transmitted to it through balls 17 and projections 15. If the pedal be retained in this position for a short time before it is further depressed to the position 2b, the shaft 5 and the driving member 7 will soon be revolving at the same or substantially the same speed as the driven member 8, so that reengagement will be effected without noise or shock, but if the pedal is not maintained in the position 2a sufficiently long to give time for the gear box members to acquire the same speed as that of the driven member before the pedal is further depressed to the position 2b, then the inclined faces 7b and 8d on the dogs 7a and 8a will come into contact at a time when the rotational speed of the driving end 7 exceeds that of the driven end 8, in which case the two members will ratchet over one another without detriment to either, which ratcheting will tend to speed up the driving shaft until the rotational speeds of the two shafts are sufficiently equalized to enable the dogs to be completely and positively interengaged with comparative smoothness by the action of the spring 9.

I claim:

1. A coupling comprising a driving member, a driven member, inter-engaging dogs on said members to provide a positive bidirectional drive through material under shear load, synchronizing means between said members to hold them apart while they rotate at different speeds, an anti-frictional medium between the driving member and said synchronizing means to permit of free relative rotation without undue friction, and anti-frictional means between the said synchronizing means and the driven member to provide for instantaneous rotational displacement of said synchronizing means when the driving member tends to rotate faster than the driven member.

2. A coupling comprising a driving member, a driven member, inter-engaging dogs on said members, a synchronizer ring anti-frictionally rotatable on said driving member, and anti-frictional means between said ring and driven member to hold said members apart while they rotate at different speeds.

3. A coupling comprising a driving member, a driven member, inter-engaging dogs on said members, a synchronizer ring anti-frictionally rotatable on and relatively to said driving member around said dogs thereon, and means radially beyond the dogs on the driven member to provide an anti-frictional contact that enables the coupling members to be held apart and quickly released for engagement when required.

4. A coupling comprising a driving member, a driven member, inter-engaging dogs on said members, a synchronizer ring anti-frictionally rotatable on and relatively to said driving member, and distance pieces on said ring for anti-frictionally engaging with the driven member and holding the two members apart while they rotate at different speeds.

5. A coupling comprising a driving member, a driven member, inter-engaging dogs on said members, a synchronizer ring anti-frictionally rotatable on and relative to said driving member, distance pieces on said ring, and anti-frictional means between the ends of said distance pieces and said driven member to hold the coupling members apart while they rotate at different speeds.

6. A coupling comprising a driving member, a driven member, inter-engaging dogs on said members, a synchronizer ring anti-frictionally rotatable on and relatively to said driving member, distance pieces on said ring means for providing an anti-frictional contact between said distance pieces and the driven member and means in the latter to receive the distance pieces when these are not holding the coupling members apart.

7. A coupling comprising a driving member, a driven member, inter-engaging dogs on said members, a synchronizer ring rotatable on and relatively to said driving member, an anti-frictional bearing between a face on said member and said ring normal to the axis of rotation, anti-frictional spacing means between said ring and driven member to hold the members apart, and means on said driven member to engage with said ring so as to enable relative rotation between said ring and said driving member to take place.

8. A coupling comprising a driving member, a driven member, inter-engaging dogs on said members, a synchronizer ring anti-frictionally rotatable on and relatively to said driving member, and anti-frictional balls between said ring and the driven member.

9. A coupling comprising a driving member, a driven member, inter-engaging dogs on said members to provide a positive bi-directional drive through material under shear load, synchronizing means between said members to hold them apart while they rotate at different speeds, an anti-frictional medium between the driving member and said synchronizing means to permit of free relative rotation without undue friction, anti-frictional means between the said synchronizing means and the driven member to provide for instantaneous rotational displacement of said synchronizing means when the driving member tends to rotate faster than the driven member, and means for re-coupling the driving and driven members at will.

10. A coupling comprising a driving member, a driven member, inter-engaging dogs on said members, a synchronizer ring anti-frictionally rotatable on said driving member, anti-frictional means between said ring and said driven member to hold said members apart while they rotate at different speeds, and means for displacing said ring at will for enabling the coupling members to be re-engaged when required.

11. A coupling comprising a driving member, a driven member, inter-engaging dogs on said members, a synchronizer ring anti-frictionally rotatable on said driving member, anti-frictional means between said ring and said driven member to hold said members apart while they rotate at different speeds, means for displacing said ring at will for enabling the coupling members to be re-engaged, and means whereby the driven member can speed up the driving member prior to re-engagement through the medium of the synchronizer ring.

PIERO MARIANO SALERNI.